UNITED STATES PATENT OFFICE.

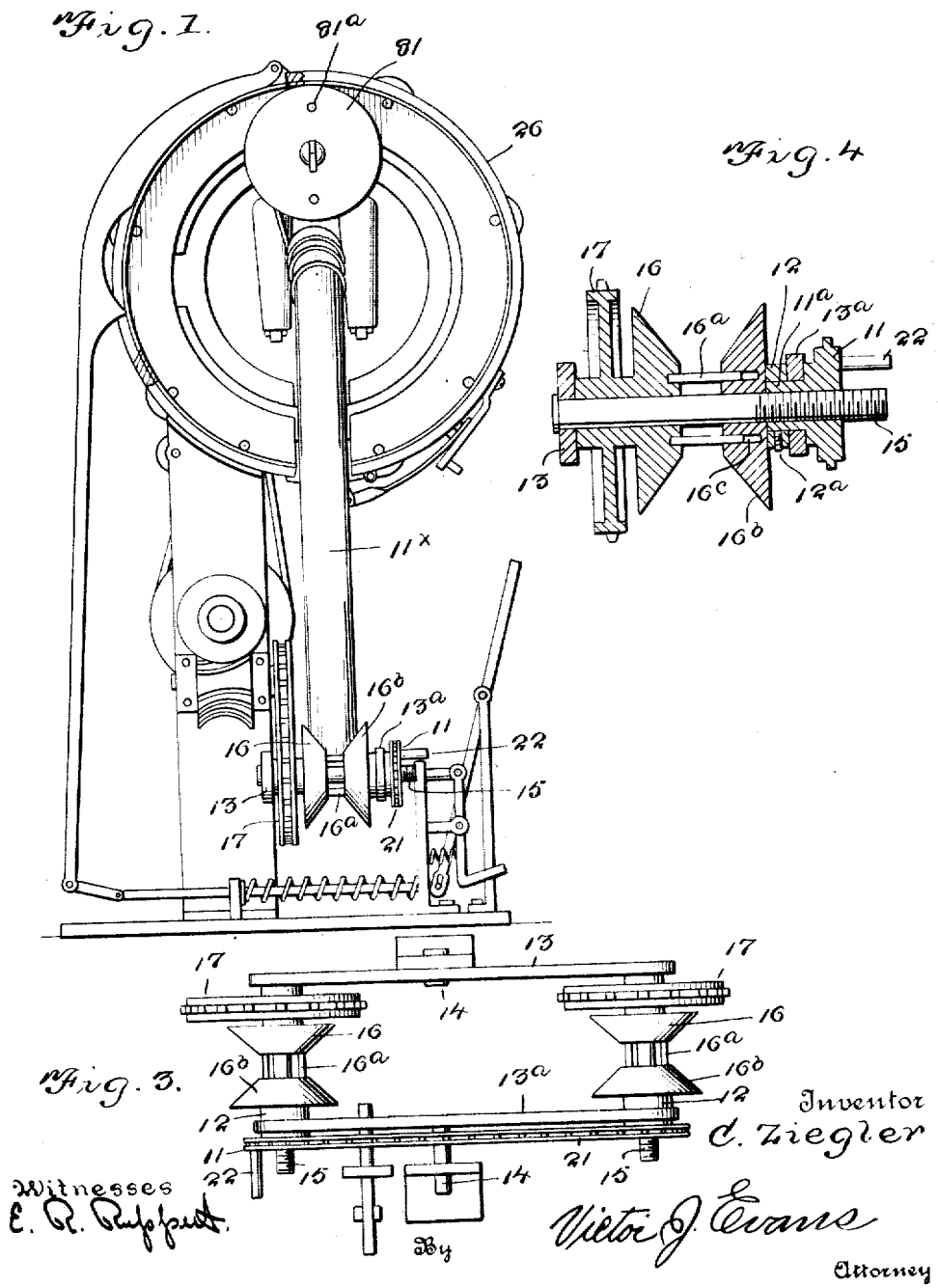

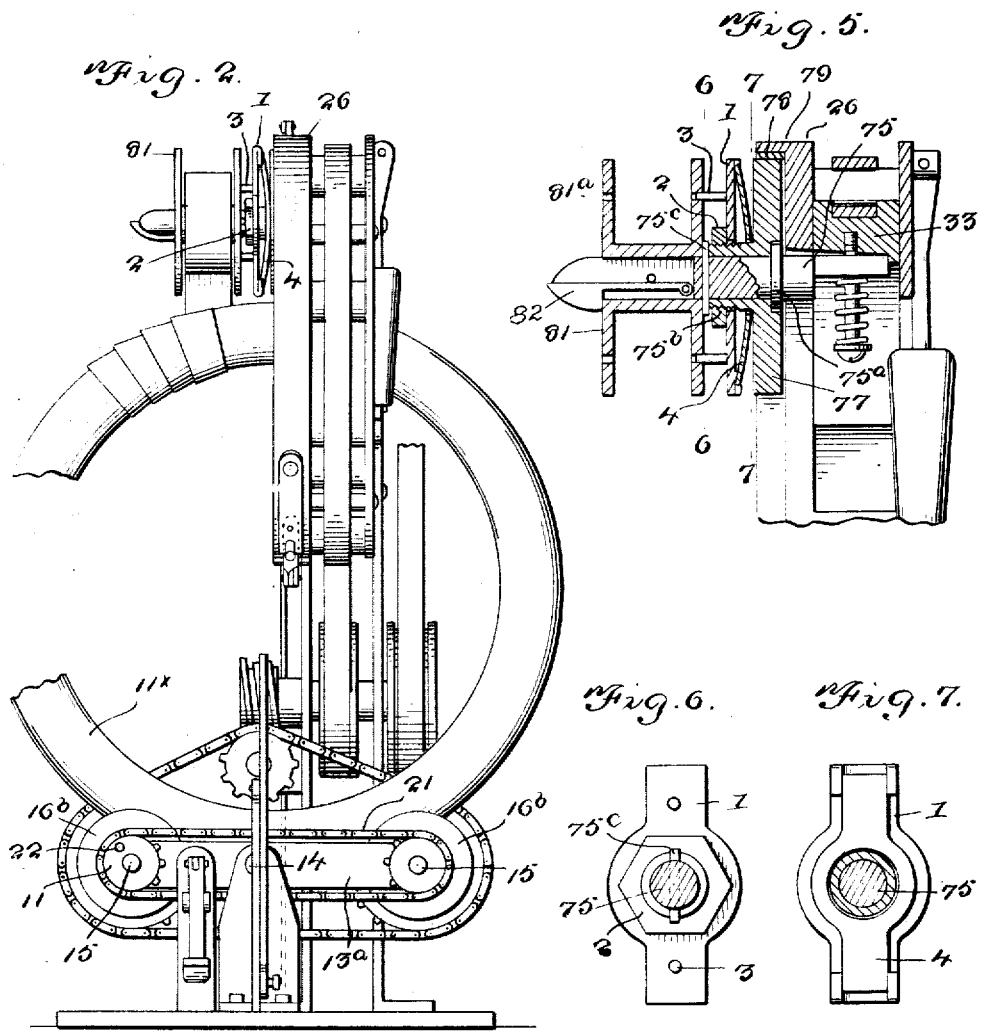

CRAWFORD ZIEGLER, OF BARBERTON, OHIO.

TIRE WRAPPING AND UNWRAPPING APPARATUS.

1,336,329.  Specification of Letters Patent.  Patented Apr. 6, 1920.

Application filed November 1, 1919. Serial No. 335,145.

*To all whom it may concern:*

Be it known that I, CRAWFORD ZIEGLER, a citizen of the United States, residing at Barberton, in the county of Summit and State of Ohio, have invented new and useful Improvements in Tire Wrapping and Unwrapping Apparatus, of which the following is a specification.

In a contemporary application filed May 26, 1919, Serial No. 299,696 I show and describe an organized mechanism for wrapping and unwrapping tires.

One object of my present sole invention is to improve the apparatus alluded to by the provision of means whereby the tension to which the wrapping tape is subjected may be nicely regulated.

Another object is to improve the said apparatus by the provision of means adapted to be adjusted to tires of different sizes in cross section and also adapted to serve as a means whereby the speed of the tire movement may be readily regulated on the theory that when the tire is moved slowly about its center it will be closely wrapped while when the tire is moved comparatively fast it will be widely wrapped.

To the attainment of the foregoing the invention consists in the improvement as hereinafter described and definitely claimed.

In the accompanying drawings, hereby made a part hereof:

Figure 1 is an elevation of the apparatus as improved.

Fig. 2 is a broken elevation taken at right angles of Fig. 1.

Fig. 3 is a detail view in plan of the cradle of the apparatus.

Fig. 4 is a detail transverse section taken at right angles to Fig. 3.

Fig. 5 is a diametrical section illustrative of the tension regulating means.

Figs. 6 and 7 are detail sections taken in the planes indicated by the lines 6—6 and 7—7, respectively of Fig. 5.

Similar numerals of reference designate corresponding parts in all of the views of the drawings.

The general construction of the improved apparatus is similar to the general construction of the apparatus disclosed in my contemporary application *supra*, and need not therefore be described herein except in conjunction with the novel features that constitute the present invention.

In furtherance of one part of my present invention I provide the spool 81 in its opposite sides with transverse apertures 81ª. Between the frame member 26 and the said spool 81 I interpose a disk 77; the spool 81 and the disk 77 being mounted on the journal 75, and the said journal being provided with a collar at 75ª, Fig. 5. The said journal 75 is carried by a revoluble annulus 33. The disk 77 is provided with the exteriorly threaded sleeve 75ᵇ, and is confined against the collar 75ª by a diametrical pin 75ᶜ, carried in the journal 75. The spool 81 is removably held on the journal 75 by the latch 82 possessed of resiliency, and hence the said spool is capable of being mounted on the journal with either of its sides toward the disk 77 according to whether tape is to be taken up on or let off the spool. Loosely surrounding the sleeve of the disk 77 is a plate 1, and arranged at the outer side of the plate 1 and threaded on the said sleeve is a nut 2. The plate 1 is equipped with outwardly extending pins 3 to enter the apertures 81ª of the spool, and between the plate 1 and the disk 77 and surrounding the disk sleeve is a bowed spring bore. It will be apparent from the foregoing that adjustment of the nut 2 toward the disk 77 will be attended by increase of the tension to which the tape on the spool 81 is subjected, while movement on the said nut 2 in a direction away from the disk 77 will bring about the lessening of the said tension. It will be noticed in this connection that rotary motion is transmitted from the disk 77 to the spool 81 through the medium of the bowed spring 4, the disk 1 and the pins 3.

By comparison of Figs. 3 and 4 it will be noticed that the cradle of the improved apparatus comprises body bars 13 and 18ª, and that said body bars are fulcrumed at 14 between standards. Extending transversely between the end portions of the said body bars are threaded bolts or rods 15 on which the body bar 13ª is laterally adjusted. This will be better understood by reference to Fig. 4 wherein it will be noted that a combined nut and sprocket gear 11 is mounted on the threaded portion of each rod 15 and that a tubular extension 11ª of the element 11 extends loosely through the body bar 13ª and is equipped at the inner side of the body bar with a collar 12, secured to the tubular extension by a set screw 12ª. Loosely mounted on the inner portions of the rods 15 are sprocket gears 17, and fixed with respect to the said sprocket gears 17 are beveled roll members 16 on which are lateral pins 16ª. Also loosely mounted on the rods 15 are roll members 16ᵇ in which are sockets 16ᶜ that receive the pins 16ª. The elements 11 are connected by a sprocket belt 21, and one of the said elements 11 is provided at 22 with a crank handle for the convenient turning thereof. Consequently when the crank handle 22 is turned the roll members 16ᵇ will be moved outwardly or inwardly on the rods 15 according to the direction of rotation. It will also be apparent that the roll members 16 and 16ᵇ will at all times rotate together as a unit, and that by regulating the distance between the roll members 16 and their complements 16ᵇ the cradle may be adapted to handle to advantage tires of different sizes in cross section. Moreover it will be appreciated that inasmuch as in the operation of the apparatus the tire, indicated by 11ˣ, is moved about its center through the medium of the roll members of the cradle, the speed at which the tire is so moved may be increased by moving the roll members 16ᵇ toward the roll members 16 and may be lessened by moving the roll members 16ᵇ away from the complementary members 16.

The general operation of my apparatus as improved is similar to that of the apparatus of my said contemporary application and therefore it is unnecessary to describe the same herein.

Having described my invention, what I claim and desire to secure by Letters-Patent is:

1. An organized mechanism for wrapping or unwrapping a tire, comprising a cradle having rolls adjacent to its ends and adapted to be driven; each of said rolls having inwardly beveled members and being adjustable as to width and adapted to seat a tire.

2. An organized mechanism for wrapping or unwrapping a tire, comprising a cradle having rolls adjacent to its ends and adapted to be driven; each of said rolls having members one of which is adjustable with respect to the other and the inner sides of which members are tapered.

3. An organized mechanism for wrapping or unwrapping a tire, comprising a cradle having rolls adjacent to its ends and adapted to be driven; each of said rolls comprising members tapered at their inner sides and one of which is adjustable with respect to the other, and means to adjustably fix the adjustable members with respect to the other members.

4. In an organized mechanism for wrapping or unwrapping tires, the combination of a cradle, and spaced rolls carried by the cradle and adapted to support and feed a tire; each of the said rolls being adjustable and shaped to seat tires of different cross sections and to regulate the speed of feed of the tires.

5. In a tire wrapping or unwrapping mechanism the combination of a frame member, a revoluble annulus, a journal carried by said annulus, a disk loose on the journal and revoluble by the frame member, a spool loose on the journal, a nut threaded on the disk, a plate loose on the disk at the opposite side of the nut to the spool and engaged with the spool, and a spring interposed between the disk and said plate.

6. In a tire wrapping or unwrapping mechanism, the cradle comprising body bars one of which is adjustable laterally toward and from the other, journals extending between said body bars, inwardly beveled roll members loose on the journals, complementary inwardly beveled roll members loose on the journals, and movable toward and from the first named roll members and having sliding connection therewith, and means connecting the last named roll members and the adjustable body bar and threaded on the journals and rotatable in concert.

In testimony whereof I affix my signature.

CRAWFORD ZIEGLER.